United States Patent
Borgner et al.

(10) Patent No.: US 6,794,032 B2
(45) Date of Patent: Sep. 21, 2004

(54) LONG-FIBER REINFORCED POLYOLEFIN PLASTIC STRUCTURE AND SHAPED BODIES FORMED THEREFROM

(75) Inventors: Thomas Borgner, Bischofsheim (DE); Joachim Heydweiller, Ruesselsheim (DE); Heinz Bernd, Heppenheim (DE); Gabriele Thomas, Dieburg (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 10/240,027
(22) PCT Filed: Mar. 28, 2001
(86) PCT No.: PCT/EP01/03508
§ 371 (c)(1),
(2), (4) Date: Oct. 31, 2002
(87) PCT Pub. No.: WO01/72883
PCT Pub. Date: Oct. 4, 2001

(65) Prior Publication Data
US 2003/0092814 A1 May 15, 2003

(30) Foreign Application Priority Data
Mar. 31, 2000 (DE) .......................... 100 15 984

(51) Int. Cl.$^7$ .............................. D02G 3/40; C08J 5/08; C08K 3/30; C08K 7/14; C08K 9/06
(52) U.S. Cl. .......................... 428/389; 428/392; 524/99; 524/100; 524/104; 524/106; 524/195; 524/213; 524/214; 524/216; 524/420
(58) Field of Search .......................... 524/99, 100, 104, 524/106, 195, 213, 214, 216, 420; 428/389, 392

(56) References Cited

U.S. PATENT DOCUMENTS

| | | | |
|---|---|---|---|
| 5,079,281 A | | 1/1992 | Takeuchi et al. ............. 523/212 |
| 5,409,763 A | * | 4/1995 | Serizawa et al. ............ 428/220 |
| 5,540,797 A | * | 7/1996 | Wilson ........................ 156/180 |
| 5,718,858 A | * | 2/1998 | Shirai et al. ................. 264/136 |
| 5,750,616 A | * | 5/1998 | Shimpuku et al. ........... 524/496 |
| 5,883,186 A | | 3/1999 | Gottschalk et al. ........... 525/66 |
| 5,911,932 A | * | 6/1999 | Dyksterhouse .............. 264/136 |
| 6,482,515 B1 | * | 11/2002 | Berndt et al. ................ 428/392 |

FOREIGN PATENT DOCUMENTS

EP 0315451 5/1989

* cited by examiner

*Primary Examiner*—Matthew A. Thexton
(74) *Attorney, Agent, or Firm*—Connolly Bove Lodge & Hutz LLP

(57) ABSTRACT

The present invention relates to a long-fiber-reinforced polyolefin structure with a length of ≧3 mm, comprising from 0.1 to 90% by weight of at least one polyolefin, from 0.1 to 50% by weight of at least one polyamide, from 0.1 to 15% by weight of at least one modified polyolefin, from 5.0 to 75% by weight of at least one reinforcing fiber, from 0.1 to 5.0% by weight of at least one additive. The present invention further relates to a process for producing a long-fiber-reinforced polyolefin structure, where fiber bundles are passed through a flat-film die which has been charged with a melt made from polyolefin, polyamide, modified polyolefin, and dye and/or pigment, the immersed fiber bundles are passed through a shaping die, the fiber bundles are cooled, and the fiber bundles are chopped to the lengths of the structure transversely to the direction of running. Finally, the present invention relates to a molded article made from a long-fiber-reinforced polyolefin structure, produced by injection molding, extrusion, blow molding, or compression with plastification. The present invention also relates to the use of a long-fiber-reinforced polyolefin structure for producing moldings for the interior or exterior of motor vehicles with very low odor emission.

13 Claims, No Drawings

LONG-FIBER REINFORCED POLYOLEFIN PLASTIC STRUCTURE AND SHAPED BODIES FORMED THEREFROM

The present invention relates to a long-fiber-reinforced polyolefin structure and to moldings produced therefrom with very good impact strength and with high heat distortion temperature (HDT), and with markedly reduced odor emission. The present invention further relates to the use of the moldings produced in the interior of motor vehicles.

Polyolefins, in particular those encompassing polyethylene and polypropylene, are low-cost thermoplastics with low density, and good fusibility, and also chemicals resistance. They are therefore widely used in sectors such as general household items, and electrical and electronic components. However, polyolefins usually have low heat distortion temperature (HDT) and low levels of mechanical properties. These plastics are therefore unsuitable for use in areas where there is a need for high heat distortion temperature and high mechanical strength.

It was known that a reinforcing fiber, such as glass fiber, can be mixed with the polyolefin to improve its strength. The fiber-reinforced polyolefin composition obtained has generally been one in which a polyolefin has been mixed with short reinforcing fibers and then the mixture has been extruded in an extruder. However, a disadvantage of this process is that the fibers break during grinding in the extruder. This process cannot give moldings which have the required relatively high mechanical strength.

It was also known that a polyolefin can be reinforced with long fibers, utilizing the character of the reinforcing fiber for the polyolefin with which it is to be mixed. One way of obtaining a long-fiber-reinforced polyolefin structure of this type is continuously to unwind a reinforcing fiber and immerse this in an emulsion or solution of a polyolefin, or in a polyolefin melt. The long-fiber-reinforced polyolefin has better mechanical properties than the short-fiber-reinforced polyolefin described above.

Although there is a requirement in the automotive industry and in similar sectors for a further increase in impact strength, this requirement cannot be complied with by conventional long-fiber-reinforced polyolefins. In order to give a further improvement in impact strength it is possible for another thermoplastic with very good impact strength to be mixed with the long-fiber-reinforced polyolefin. However, simple mixing of the polyolefin with another plastic cannot give products whose mechanical properties are industrially useful. The reason for this appears to be the low mutual dispersibility of the plastics.

U.S. Pat. No. 5,409,763 discloses a rod-shaped long-fiber-reinforced polyolefin structure with a length of at least 3 mm, produced by mixing 100 parts by weight of a plastics component encompassing from 99 to 50 parts by weight of a polyolefin and from 1 to 50 parts by weight of a polyamide with from 10 to 200 parts by weight of a reinforcing fiber. The length of the reinforcing fiber is the same as that of the structure, and the arrangement of the reinforcing fiber is substantially longitudinal. That publication also discloses an article which has been molded from this rod-shaped long-fiber-reinforced polyolefin. The dispersed reinforcing fiber in the polyamide has an average fiber length of at least 1 mm, and there is interpenetration of the polyolefin and the polyamide to form a network dispersion.

The polyamide plastic used has strength which exceeds that of the polyolefin, and has surface tension between that of the polyolefin and that of a reinforcing fiber, such as glass fiber. A rod-shaped structure is produced by mixing, in the melt, of the polyolefin with the polyamide, and immersing the reinforcing fiber in the melt, and molding the rod-shaped structure. This gives a molding with extremely high impact strength. In this, the polyamide forms a network structure with the reinforcing fiber and at the same time with the polyolefin. This network structure is further improved as fiber length increases.

It is known that it is preferable to use a modified polyolefin, since it bears functional groups which have high affinity for the polyamide. This increases the affinity between the polyolefin and the polyamide, and therefore improves capability to develop a network structure. The effect cannot begin to occur until the proportion of modified polyolefin is at least 1% by weight. If the proportion exceeds 50% by weight, the viscosity of the composition rises, and this can cause difficulties during shaping.

The polyolefin may be prepared by polymerizing an α-olefin, such as ethylene or propylene, using a suitable catalyst.

Various known polyamides may be used as polyamide. If the proportion of polyamide in the mixture is below 1%, no effective improvement in impact strength can be achieved. If the proportion exceeds 50%, the volume change of the molding due to water absorption becomes problematic.

If the proportion of reinforcing fiber is less than 10 parts by weight, the fibers achieve only a small reinforcing effect. If the proportion of reinforcing fiber exceeds 200 parts by weight, the production of the rod-shaped structure becomes difficult, or capability for processing to give a molding is considerably impaired.

There are prior-art compositions made from polyolefin, polyamide, modified polyolefin, and glass fiber. Examples of these compositions are described, inter alia, in JP-A 03126740, JP-A 03124748, GB-A 2225584, JP-A 02107664, JP-A 01087656, JP-A 01066268, JP-A 63305148, JP-B 06018929, JP-A 60104136, JP-B 61026939, JP-A 56030451, JP-A 6322266, JP-A 7053861, and JP-A 6234896.

There are many applications demanding a long-fiber-reinforced polyolefin structure. For stabilization with respect to oxidation and UV irradiation, and also for coloring, the long-fiber-reinforced polyolefin structure is treated with at least one additive. The addition of even small amounts of at least one additive, such as dye and/or pigment, has considerable effects on the mechanical properties of the polyolefin.

A pigment which can be used in a short-fiber-reinforced polyolefin structure is $TiO_2$. $TiO_2$ is not a suitable pigment in a long-fiber-reinforced polyolefin structure, since addition of $TiO_2$ impairs mechanical properties.

It has been found that sulfur-containing additives are particularly suitable in a long-fiber-reinforced polyolefin structure, since they do not affect mechanical properties. However, a decisive disadvantage of sulfur-containing additives is unpleasant odor emission. The odor emission makes the long-fiber-reinforced polyolefin structure with sulfur-containing additives unusable for production of parts of the interior of motor vehicles, despite good mechanical properties.

The object of the present invention is to provide a long-fiber-reinforced polyolefin structure with very good mechanical properties, with good heat resistance and low water absorption, and with low odor emission, together with an environmentally compatible and cost-effective process for its production.

The object of the present invention is achieved by means of a long-fiber-reinforced polyolefin structure with a length of $\geq 3$ mm, comprising a) from 0.1 to 90% by weight of at least one polyolefin,
b) from 0.1 to 50% by weight of at least one polyamide,
c) from 0.1 to 15% by weight of at least one modified polyolefin,
d) from 5.0 to 75% by weight of at least one reinforcing fiber,
e) from 0.1 to 10% by weight of at least one sulfur-containing additive.

The present invention is characterized by the use of at least one sulfur-containing additive, such as a dye and/or pigment. Unexpectedly and surprisingly, despite addition of at least one dye and/or pigment, the resultant colored long-fiber-reinforced polymer mixture has very good mechanical properties, very good heat resistance, and low water absorption. This polymer mixture has not only good mechanical properties but also surprisingly low odor emission, despite the use of at least one sulfur-containing additive.

The sulfur-containing additive in colored long-fiber-reinforced polyolefin structures is preferably a sulfur-containing colorant, with preference a sulfur-containing pigment, and particularly preferably a sulfide-containing pigment such as zinc sulfide and mixtures thereof. Surprisingly and unexpectedly, the odor emission of the long-fiber-reinforced polyolefin structure of the invention has been found to be substantially lower specifically when using these sulfur- and/or sulfide-containing colorants, in particular pigments.

One preferred embodiment of the invention is a long-fiber-reinforced polyolefin structure comprising a) from 4.0 to 70% by weight of at least one polyolefin,
b) from 1.0 to 40% by weight of at least one polyamide,
c) from 0.8 to 13% by weight of at least one modified polyolefin,
d) from 10 to 65% by weight of at least one reinforcing fiber,
e) from 0.15 to 7.5% by weight of at least one sulfur-containing additive.

This composition has excellent mechanical properties and heat resistance, and very low water absorption, and very low odor emission.

One particularly preferred embodiment of the invention is a long-fiber-reinforced polyolefin structure comprising a) from 30 to 58% by weight of at least one polyolefin,
b) from 4.0 to 30% by weight of at least one polyamide,
c) from 1.5 to 10% by weight of at least one modified polyolefin,
d) from 19 to 58% by weight of at least one reinforcing fiber,
e) from 0.2 to 5.0% by weight of at least one sulfur-containing additive.

This composition has quite excellent mechanical properties and heat resistance, and very low water absorption, and exceptionally low odor emission.

According to the invention, the polyolefin (a) can be obtained by addition polymerization of an α-olefin, such as ethylene or propylene, using a suitable catalyst. Examples of the polyolefin (a) are homopolymers of high, medium, or low density, for example polyethylene, polypropylene, polymethylpentene, and copolymers of these polymers. The homopolymer and copolymers may be straight-chain or branched. There is no restriction on branching, as long as the material can be shaped. It is possible to use a mixture of two or more of these polymers. According to the invention, the use of polypropylene as polyolefin is preferred. The amounts of the polyolefin which may be present in the long-fiber-reinforced polyolefin structure of the invention are moreover from 0.1 to 20% by weight, from 20 to 24% by weight, from 25 to 30% by weight, or else from 80 to 90% by weight.

According to the invention, various polyamides may be used as the polyamide (b). Examples are polyamides obtained by polycondensing dicarboxylic acids, such as oxalic acid, adipic acid, suberic acid, sebacic acid, terephthalic acid, isophthalic acid, or cyclohexane-1,4-dicarboxylic acid, with a diamine, such as ethylenediamine, pentamethylenediamine, hexamethylenediamine, decamethylenediamine, 1,4-cyclohexanediamine, or m-xylenediamine, polyamide compounds obtained by polymerizing a cyclic lactam, such as caprolactam or laurolactam, and polyamides obtained by copolymerizing a cyclic lactam and a dicarboxylic salt with a diamine.

Among these, according to the invention preference is given to nylon-6, nylon-6,6, and copolymers of these. According to the invention, nylon-6 is particularly preferred as polyamide (b). The heat distortion temperature (HDT) of nylon-6 is higher than that of the polyolefin (a). The addition of nylon-6 increases the HDT, and also the impact strength of the mixture. It is particularly advantageous to use from 4 to 15% by weight of the polyamide. Other amounts of the polyamide which may be present in the long-fiber-reinforced polyolefin structure of the invention are from 0.1 to 2.4% by weight, from 12.5 to 25% by weight, or from 25 to 50% by weight.

According to the invention, the modified polyolefin (c) contains from 1 to 50% by weight of at least one of the following groups: carboxy, carboxylic anhydride, metal carboxylate, carboxylic ester, imino, amino, or epoxy group, based on the total content of (a) and (c). Examples of the modified polyolefin encompass modified polyolefin copolymers or grafted copolymers for which the method of preparation comprises the chemical introduction of compounds such as those in the following list: maleic anhydride, fumaric anhydride, citric anhydride, N-phenylmaleimide, N-cyclohexylmaleimide, glycidyl acrylate, glycidyl methacrylate, glycidyl vinylbenzoate, N-[4-(2,3-epoxypropoxy)-3,5-dimethylbenzyl]acrylamide (AXE), alkyl methacrylates and/or derivatives thereof into polyolefins, such as polypropylene, polyethylene or ethylene-propylene copolymers, or the chemical introduction of grafted polyolefins into polyamide. There is no restriction on the degree of polymerization of the modified polyolefin, which may also be an oligomer. Particularly preferred modified polyolefins are maleic-anhydride-modified polyethylene,
maleic-anhydride-modified polypropylene,
maleic-anhydride-modified polyethylene-polypropylene copolymer,
fumaric-anhydride-modified polyethylene,
fumaric-anhydride-modified polypropylene,
fumaric-anhydride-modified polyethylene-polypropylene copolymer,
glycidyl-methacrylate-modified polyethylene,
glycidyl-methacrylate-modified polypropylene,
AXE-modified polyethylene,
AXE-modified polypropylene, and
polyamide-grafted polyolefins.

Amounts of from 0.1 to 2.4% by weight, in particular from 0.1 to 0.5% by weight, or from 12.5 to 15% by weight, of the modified polyolefin may also be present in the long-fiber-reinforced polyolefin structure of the invention.

According to the invention, the reinforcing fiber (d) is not restricted to any particular material. Examples of reinforcing fibers which may used and have a high melting point (softening point) are glass fiber, carbon fiber, metal fiber, and aromatic polyamide fiber. According to the invention, it is preferable to use glass fibers. When glass fibers are used, it is usual to use bundles with a fiber diameter of from 8 to 25 μm and with a weight of from 500 to 4 400 g per 1 000 m. The fiber may have been surface-treated in a manner known per se. The amounts of the reinforcing fibers present in the long-fiber-reinforced polyolefin structure of the invention may moreover be from 5 to 16% by weight or from 50 to 75% by weight.

The fiber bundles are obtained by taking a number of fibers and treating these with an aqueous solution or aqueous emulsion of a size system, and then bundling the fibers. Preference is given to the use of wound fiber bundles which are bundled, dried, and wound on packages (direct roving). The result is fiber bundles which are substantially continuous.

Known additives, such as lubricants, dyes, pigments, antioxidants, heat stabilizers, light stabilizers, reinforcing materials, and hydrolysis stabilizers, may also be present in the polyolefin structure.

The long-fiber-reinforced polyolefin structure of the invention preferably comprises, as additives, at least one antioxidant, and/or UV stabilizer, and/or color masterbatch.

It has been found that polyamides contain functional groups and/or low-molecular-weight constituents which can bind acid. The odor-reducing action may also be achieved by adding acid-binding additives. Suitable examples of these are low-molecular-weight compounds, in particular nitrogen-containing compounds. Particularly suitable compounds are those of the groups consisting of amines, amides, acidic amides, and polyamide, and those of similar classes of substance.

Other suitable nitrogen-containing compounds are heterocyclic compounds having at least one nitrogen atom as heteroatom adjacent either to an amino-substituted carbon atom or to a carbonyl group, for example pyridazine, pyrimidine, pyrazine, pyrrolidone, aminopyridine, and compounds derived therefrom. Advantageous compounds of this nature are aminopyridine and compounds derived therefrom. In principle, any of the aminopyridines are suitable, for example melamine, 2,6-diaminopyridine, substituted and dimeric aminopyridines, and mixtures prepared from these compounds. Other advantageous compounds are polyamides and dicyandiamide, urea and its derivatives, and also pyrrolidone and compounds derived therefrom. Examples of suitable pyrrolidones are imidazolidinone and compounds therefrom, for example hydantoin and its derivatives, and also allantoin and its derivatives. Other suitable compounds are triamino-1,3,5-triazine (melamine) and its derivatives, such as melamine-formaldehyde condensates, and methylolmelamine. Advantageous compounds are melamine, methylolmelamine, melamine-formaldehyde condensates, and allantoin. The nitrogen-containing compounds may be used singly or in combination, or in combination with polyamide. The amounts which may be present of these nitrogen-containing compounds are from 0 to 50% by weight, advantageously from 0.0001 to 40% by weight, in particular from 0.0001 to 5% by weight.

The long-fiber-reinforced polyolefin structure comprises from 0.1 to 4.0% by weight, preferably from 0.15 to 3.0% by weight, and particularly preferably from 0.2 to 2.0% by weight, of antioxidant.

The long-fiber-reinforced polyolefin structure comprises from 0.1 to 4.0% by weight, preferably from 0.15 to 3.0% by weight, and particularly preferably from 0.5 to 1.5% by weight, of U.V.stabilizer.

The long-fiber-reinforced polyolefin structure comprises from 0.1 to 4.0% by weight, preferably from 0.15 to 3.0% by weight, and particularly preferably from 0.5 to 1.5% by weight, of color masterbatch.

According to the invention, the long-fiber-reinforced polyolefin structure is preferably produced by the pultrusion process, where I) fiber bundles are passed through a flat-film die charged with a melt made from polyolefin (a), polyamide (b), modified polyolefin (c), and dye and/or pigment (e), II) the immersed fiber bundles are passed through a shaping die, III) the fiber bundles are cooled, IV) the fiber bundles are post-formed, and V) the fiber bundles are chopped to the length of the structure, transversely to the direction of running, or are wound up in the form of a continuous structure.

The environmentally compatible and cost-effective process of the invention is a rod-shaped structure with a particular shape. The rod-shaped structure has a length of from 3 to 100 mm, preferably from 4 to 50 mm, and particularly preferably from 5 to 15 mm. The rod-shaped structure, also termed a pellet, has a diameter of from 1 to 10 mm, from 2 to 8 mm, or particularly preferably from 3 to 6 mm.

The invention also provides a process where polyolefin (a), polyamide (b), and modified polyolefin (c) are mixed in the extruder, and the reinforcing fiber (d) is wetted by the melt, and the material obtained is then pelletized. The resultant pellets may be mixed with dye and/or pigment, and processed in another process to give the preferably colored component with very low odor emission.

The invention also produces the long-fiber-reinforced polyolefin structure by the compounding process or by the direct process.

According to the invention, a molded article is molded from the molten, preferably colored, long-fiber-reinforced polyolefin pellets in a manner known per se, such as injection molding, extrusion, blow molding, or compression with plastification.

According to the invention, the structure of the long-fiber-reinforced polyolefin is that of a rod, a strip, a ribbon, or a sheet. Preference is given to the shape of a rod, obtained by coating the surface of the fiber, and therefore of the composed, bundled fiber, arranged to be parallel, continuously with a thermoplastic to give a strand, and then chopping it to the necessary length.

According to the invention, the components other than the reinforcing fiber may be mixed, in the melt, in a kneader or extruder. The temperature set is above the melting point of the higher-melting polymer by from 5 to 100° K, preferably from 10 to 60° K. The mixing in the melt is complete after a period of from 30 seconds to 15 minutes, preferably from 1 minute to 10 minutes.

According to the invention, the long-fiber-reinforced polyolefin structure is used to produce moldings. The moldings produced from the preferably colored long-fiber-reinforced polyolefin structure of the invention have excellent mechanical properties, in particular excellent impact strength, high heat resistance, and low deformability due to water absorption. The coloring thus achieved features good uniformity and no color change.

According to the invention, the preferably colored long-fiber-reinforced polyolefin structure is preferably used to produce preferably colored moldings which are subject to high levels of mechanical and thermal stress, for example moldings in motor vehicle construction, in particular since there is a low level of odor emission in the interior of a motor vehicle.

Examples are used below for further illustration of the invention.

EXAMPLES

The colored long-fiber-reinforced polyolefin structures studied were produced by the pultrusion process. For this, a number of glass fiber bundles (E glass, direct roving 2400 tex) were heated during continuous unwinding, and then passed through a melt die. The melt die had been charged with a melt made from a polypropylene (MFR 230/2.16 g per 10 min=48, measured to ISO 1133), nylon-6 (VN=143 ml/g, measured in $H_2SO_4$), maleic-anhydride-grafted polypropylene (Polybond® 3200, Uniroyal Chemical), and color masterbatch comprising zinc sulfide (ZnS) (gray, substantially composed of 30% by weight of gray pigments, white, and black, and 70% by weight of carrier substance). The constituents of the milk were melted in advance in an extruder in the weight ratio given in tables 1 and 3. The series of glass fiber bundles were then immersed in the molten plastic in the melt die. The proportion of the glass fiber bundles in this step was set at 40% by weight by controlling the take-off speed of the glass fiber bundles and the amounts of molten polypropylene added. The series of polypropylene-containing glass fibers (strands) were taken from the melt die and passed through a shaping die and a shaping roller, and cooled. The strands were then chopped to give a rod-shaped structure of length 10 mm, using a strand pelletizer.

The resultant pellets were injection-molded to give the test specimens described below. Impact strength and other mechanical properties were measured as described below.

Tensile strain at break and tensile modulus of elasticity (Sekante betw. 0.05 and 0.25% strain) on standard specimen ISO B to ISO 527, Charpy AcU impact strength on standard specimen ISO A to ISO 179, Flexural strength and flexural modulus of elasticity on standard specimen ISO A in the three-point flexural test to DIN 53 453.
The test results are seen in table 2.

Comparative Examples

Compositions without polyamide (comparative examples 1 and 2) and without pigment (comparative example 3) were taken as comparative examples. The constituents of these compositions are seen in tables 1 and 3, and the values measured are seen in tables 2 and 4.

TABLE 1

| Constituents | Example 1 % by weight | Comparative example 1 % by weight |
| --- | --- | --- |
| Polypropylene | 34.10 | 53.60 |
| Polyamide | 14.70 | 0.00 |
| Modified polypropylene | 7.30 | 2.1 |
| Glass fiber | 40.00 | 40.00 |
| Antioxidant | 1.50 | 1.60 |
| UV stabilizer | 1.50 | 1.60 |
| Color masterbatch | 1.00 | 1.10 |

TABLE 2

| Mechanical properties | Units | Example 1 | Comparative example 1 |
| --- | --- | --- | --- |
| Tensile modulus of elasticity | [GPa] | 8.60 | 7.90 |
| AcU | [kJ/m$^2$] | 70.00 | 59.00 |
| Tensile strain at break | [%] | 2.60 | 2.20 |
| Flexural strength | [MPa] | 190.00 | 152.00 |
| Flexural modulus | [GPa] | 9.50 | 7.80 |

TABLE 3

| | Example | | Comparative examples | |
| --- | --- | --- | --- | --- |
| Constituents | 2 % by weight | 3 % by weight | 2 % by weight | 3 % by weight |
| Polypropylene | 47.48 | 37.88 | 57.52 | 58.10 |
| Polyamide | 4.90 | 14.60 | 0.00 | 0.60 |
| Modified polypropylene | 7.30 | 7.30 | 2.16 | 1.30 |
| Glass fiber | 40.00 | 40.00 | 40.00 | 40.00 |
| Pigment | 0.32 | 0.32 | 0.32 | 0.00 |

TABLE 4

| Mechanical properties | Units | Examples | | Comparative examples | |
| --- | --- | --- | --- | --- | --- |
| | | 2 | 3 | 2 | 3 |
| Tensile modulus of elasticity | [GPa] | 8.00 | 8.60 | 7.90 | 7.50 |
| AcU | [kJ/m$^2$] | 68.00 | 70.00 | 59.00 | 69.00 |
| Tensile strain at break | [%] | 2.70 | 2.60 | 2.20 | 2.40 |
| Flexural strength | [MPa] | 161.00 | 190.00 | 152.00 | 161.00 |
| Flexural modulus | [GPa] | 8.60 | 9.50 | 7.80 | 7.90 |

Comparison of the examples and comparative examples 1 and 2 shows that the compositions with pigment content but without polyamide have poorer mechanical properties. Comparison of comparative example 1 with comparative example 2 shows that addition of small amounts of pigment leads to a marked fall-off in impact strength (AcU). This effect can be demonstrated clearly even though comparative example 2 comprises a very small proportion of polyamide. Example 3 shows that when polyamide and pigment are used the mechanical properties achieved are comparable with the properties of an unpigmented specimen.

The long-fiber-reinforced polyolefin structures of examples 1 to 3 and of the comparative example differ particularly in that, with sulfide-containing additives, polyamide is present in examples 1 to 3 and no polyamide is present in comparative examples 1 and 2. If the long-fiber-reinforced polyolefin structures are compared it is noticeable that the long-fiber-reinforced polyolefin structures produced as in the examples have substantially lower odor emissions when compared with comparative examples 1 and 2. The human sense of smell cannot detect, or can hardly detect, the unpleasant sulfide odor in the case of the long-fiber-reinforced polyolefin structure of the invention.

Surprisingly and unexpectedly, the invention shows that the long-fiber-reinforced polyolefin structures of the invention not only have considerably improved mechanical properties but also eliminate the odor emission which is otherwise usual.

What is claimed is:

1. Long-fiber-reinforced polyolefin structure with a length of 3≧mm, comprising
   a) from 30 to 58% by weight of at least one polyolefin,
   b) from 4.0 to 15% by weight of at least one polyanilde,
   c) from 1.5 to 10% by weight of at least one modified polyolefin,
   d) from 19 to 58% by weight of at least one reinforcing fiber,
   e) from 0.2 to 5.0% by weight of at least one sulfur-containing additive.

2. Long-fiber-reinforced polyolefin structure according to claim 1, wherein the modified polyolefin (c) contains from 1 to 50% by weight of at least one of the following groups: carboxy, carboxylic anhydride, metal carboxylate, carboxylic ester, imino, amino, or epoxy group, based on the total content of (a) and (c).

3. Long-fiber-reinforced polyolefin structure according to claim 1, wherein the polyolefin (a) is polypropylene.

4. Long-fiber-reinforced polyolefin structure according to claim 1, wherein the polyamide (b) is nylon-6.

5. Long-fiber-reinforced polyolefin structure according to claim 1, wherein the reinforcing fiber (d) is talc, steel fiber, wollastonite or glass fiber.

6. Long-fiber-reinforced polyolefin structure according to claim 1, wherein said polyolefin (a) is polypropylene, said polyamide (b) is nylon-6, said modified polyolefin (c) contains from 1 to 50% by weight of at least one of the following groups: carboxy, carboxylic anhydride, metal carboxylate, carboxylic ester, imino, amino, or epoxy group, based on the total content of (a) and (c), and said reinforcing fiber (d) is talc, steel fiber, wollastonite or glass fiber.

7. Long-fiber-reinforced polyolefin structure according to claim 1, wherein the structure has a length of from 3 to 100 mm.

8. Long-fiber-reinforced polyolefin structure according to claim 1, wherein the sulfide-containing additive is a sulfur-containing colorant.

9. Long-fiber-reinforced polyolefin structure according to ciaim 1, wherein the sulfur-containing additive is a sulfide-containing pigment.

10. Long-fiber-reinforced polyolefin structure according to claim 1, wherein said sulfur-containing additive is zinc sulfide.

11. Long-fiber-reinforced polyolefin structure according to claim 1, comprising from 0 to 50% by weight of an acid-binding additive.

12. Long-fiber-reinforced polyolefin structure according to claim 1, wherein said acid-binder additive is present and is selected from the group consisting of amine, amide, acidic amide and polyamide.

13. Long-fiber-reinforced polyolefin structure according to claim 11, wherein the acid binding additive is present and is made of one or more compounds selected from the group consisting of amines, amides, acidic amides, heterocyclic compounds having at least one nitrogen atom as heteroatom, pyridazine, pyrimidine, pyrazine, aminopyridine, melamine, 2,6-diaminopyridine, substituted and dimeric aminopyridines, dicyandiamide, urea and its derivatives, pyrrolidone, imidazolidinone, hydantoin and its derivatives, allantoin and its derivatives, triamino-1,3,5-triazine (melamine) and its derivatives, melamine-formaldehyde condensates and methylolmelamine.

* * * * *

UNITED STATES PATENT AND TRADEMARK OFFICE
CERTIFICATE OF CORRECTION

PATENT NO. : 6,794,032 B2  Page 1 of 1
DATED : September 21, 2004
INVENTOR(S) : Thomas Borgner et al.

It is certified that error appears in the above-identified patent and that said Letters Patent is hereby corrected as shown below:

Column 9,
Line 5, "polyanilde" should read -- polyamide --.

Signed and Sealed this

Fifteenth Day of March, 2005

JON W. DUDAS
*Director of the United States Patent and Trademark Office*